(12) United States Patent
Sokolov et al.

(10) Patent No.: US 8,883,038 B2
(45) Date of Patent: Nov. 11, 2014

(54) SYNTHESES OF ULTRA-BRIGHT FLUORESCENT SILICA PARTICLES

(75) Inventors: Igor Sokolov, Postdam, NY (US); Sajo Naik, Potsdam, NY (US)

(73) Assignee: Clarkson University, Potsdam, NY (US)

( * ) Notice: Subject to any disclaimer, the term of this patent is extended or adjusted under 35 U.S.C. 154(b) by 0 days.

(21) Appl. No.: 11/825,313

(22) Filed: Jul. 5, 2007

(65) Prior Publication Data
US 2012/0187340 A1    Jul. 26, 2012

Related U.S. Application Data

(60) Provisional application No. 60/818,341, filed on Jul. 5, 2006, provisional application No. 60/857,138, filed on Nov. 7, 2006.

(51) Int. Cl.
| | | |
|---|---|---|
| C09K 11/06 | (2006.01) | |
| C01B 33/12 | (2006.01) | |
| C09K 11/02 | (2006.01) | |
| C01B 33/18 | (2006.01) | |

(52) U.S. Cl.
CPC .............. C09K 11/06 (2013.01); C09K 11/025 (2013.01); C01B 33/18 (2013.01)
USPC .................................................. 252/301.16

(58) Field of Classification Search
USPC .................................................. 252/301.16
See application file for complete search history.

(56) References Cited

U.S. PATENT DOCUMENTS

| | | | | |
|---|---|---|---|---|
| 5,480,582 | A | * | 1/1996 | Pope ...................... 252/301.4 F |
| 7,754,646 | B2 | * | 7/2010 | Trau et al. ..................... 502/233 |
| 8,206,328 | B2 | * | 6/2012 | Adamson ...................... 601/133 |
| 2007/0026407 | A1 | * | 2/2007 | Matsumoto et al. .............. 435/6 |

FOREIGN PATENT DOCUMENTS

| | | | |
|---|---|---|---|
| WO | WO 2004/081222 | * | 9/2004 |
| WO | WO 2005/023961 | * | 3/2005 |
| WO | WO 2006/133519 | * | 12/2006 |
| WO | WO 2007/044711 | * | 4/2007 |

OTHER PUBLICATIONS

Yang et al, "Formation of Hollow Helicoids in Mesoporous Silica: Supramolecular Origami", Adv. Mater, 1999, 11, No. 17, pp. 1427-1431.*
Sokolov and Kievsky, "3D Design of self-assembled nanoporous colloids", Studies in Surface and Catalysis, 156, 2005, pp. 433-442.*
Sokolov et al, "Self-Assembly of Ultrabright Fluorescnet Silica Particles", Small, 3, pp. 419-423, Jan. 24, 2007.*

* cited by examiner

*Primary Examiner* — Carol M Koslow
(74) *Attorney, Agent, or Firm* — George R. McGuire; Blaine T. Bettinger; Bond Schoeneck & King, PLLC

(57) ABSTRACT

The object of the invention is to producing ultras bright fluorescent silica particles by synthesizing large nanopore silica particles with self sealed channels/pores and then stopping the synthesizing before large nanopore silica particles have been formed, wherein said sintering solution has produced nanoparticles. The large nanopore silica particles are micron size. The synthesizing is stopped by diluting said synthesizing solution with a neutralizing medium such as an aqueous solution of definite acidity of pH7 and higher an exemplary value of pH11 (sodium hydroxide). The time range for stopping the synthesizing ranges from tens of seconds to ten of minutes.

15 Claims, 15 Drawing Sheets

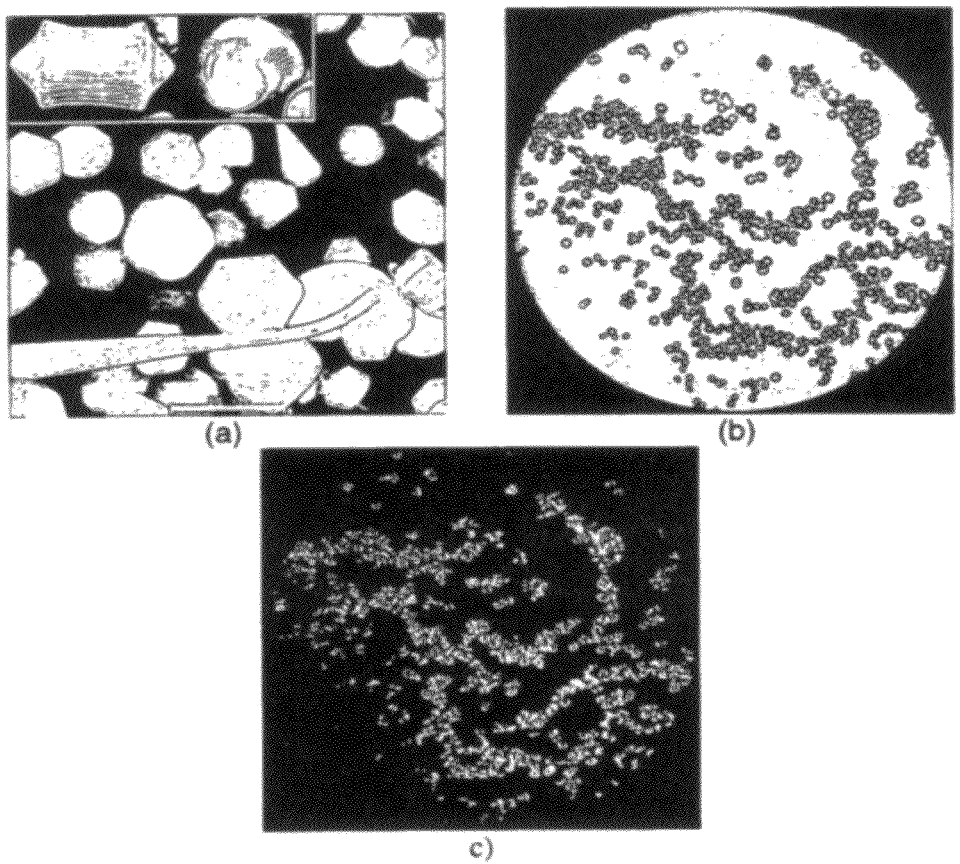
Figures 2 (a), (b), and (c)

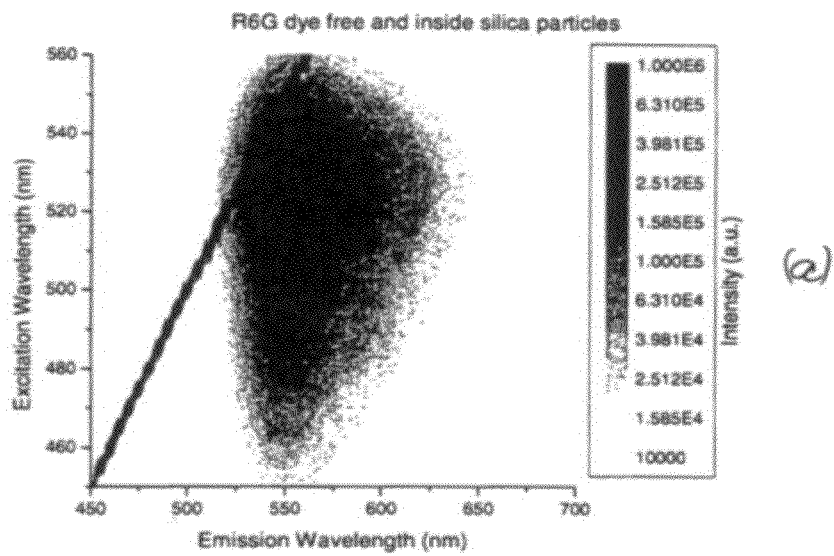
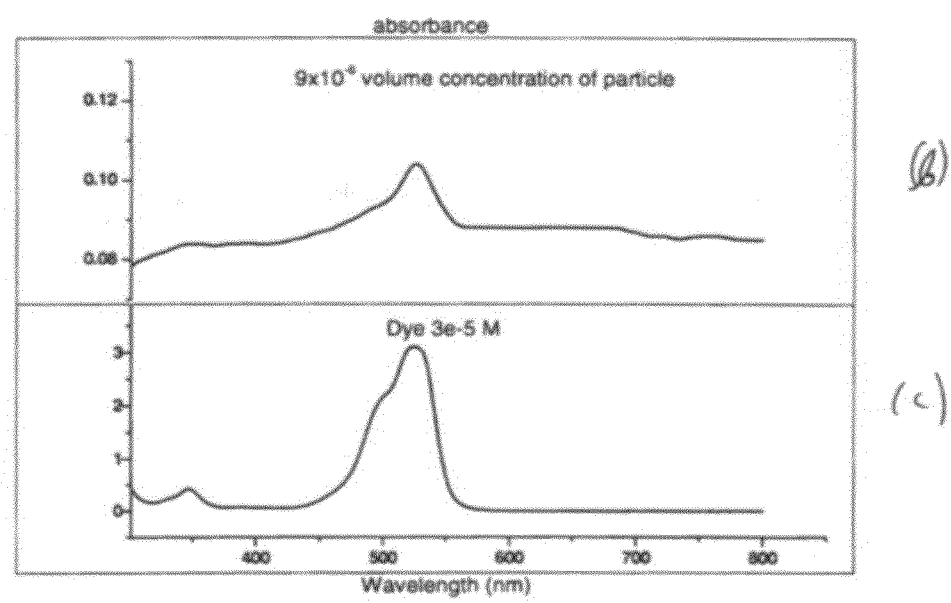
Figures 3 (a), (b), and (c)

Figure 5 (a) and (b)

Figures 6 (a) and (b)

Figures 7 (a), (b), (c) and (d)

Figures 14 (a) and (b)

SYNTHESES OF ULTRA-BRIGHT FLUORESCENT SILICA PARTICLES

CROSS REFERENCE

This application is related to provisional application 60/818,341 filed Jul. 5, 2006 entitled "Assembly of Super-Bright Fluorescent Silica Particles" and to provisional application 60/857,138 filed Nov. 7, 2006 entitled "Synthesis of Ultra-bright Luminescent Silica Nanoparticles", both hereby incorporated by reference.

FIELD OF INVENTION

The field of the invention is synthetic of fluorescent silica particles. The next sentence: In particular, the field of invention includes the use of bright fluorofores for tagging, tracing, labeling, sensing and medical applications.

BACKGROUND OF THE INVENTION

Fluorescent particles have a broad application in tagging, tracing, and labeling (Hasegawa et al., 2005, Edwards et al., 2004, Lizard et al., 2004, Meldal, 2002, and Ohata et al., 2003). Fluorescence is typically made through incorporating either inorganic or organic fluorescent dyes into the particle's material. While inorganic dyes are typically more stable, their number and compatibility is rather restricted. A large variety of organic dyes makes them attractive for creating fluorescent particles. However the problems are in the dye's stability and its typically high toxicity. Incorporation of dyes into silica matrix seems to be one of most promising approaches because of excellent sealing ability of silica and wide compatibility of silica with other materials. Numerous attempts to embed organic dyes into silica xerogels and zeolites have been known for long time (Rao and Rao, 2003, Klonkowski et al., 2002, Deshpande and Kumar, 2002, Leventis et al., 1999, del Monte and Levy, 1998, Suratwala et al., 1998, Calzaferri et al., 2003, Ow et al., 2003, Zhao et al., 2004, Santra et al., 2004). To prevent leakage of the dyes out of the porous matrix, dyes were covalently bound to the silica matrix (Frantz et al., 2002, Leventis et al., 1999, Baker et al., 1999, Suratwala et al., 1998, Lin et al., 2005). While the photo stability of such materials was higher than stability of pure dyes, it did not prevent bleaching substances, including oxygen, from penetration inside such a composite material.

Fluorescent particles are widely manufactured, but the processes used for their production are often tightly held trade secrets. So far the brightest particles have been made of quantum dots incorporated into polymer matrix (Han, et al. 2001), the case of micron size particles, or quantum dots themselves, and the case of nanometer size particles. Incorporation of dyes and quantum dots into glass particles seems to be one of most promising approaches because of excellent sealing ability of the glass and wide compatibility of glass with other materials.

SUMMARY OF THE INVENTION

The object of the invention is to produce ultra bright fluorescent silica particles by synthesizing large nanopore silica particles with self sealed channels/pores and then stopping the synthesizing before large nanopore silica particles have been formed, wherein said synthesizing solution has produced nanoparticles. The large nanopore silica particles are micron size. The synthesizing is stopped by diluting said synthesizing solution with a neutralizing medium such as an aqueous solution of definite acidity of pH7 and higher an exemplary value of pH11 (sodium hydroxide). The time range for stopping the synthesizing ranges from tens of seconds to tens of minutes.

The process further includes extracting synthesis nanoparticles from the stopped synthesis using dialysis against the aqueous solution. Pure water is an exemplary aqueous medium.

The process includes adding multiple luminescent dyes are added during the syntheses.

The process may use several different combinations of reactants which result in a self-sealed pore (no open pore) topology. These include: H2O, HCl, formamide; hexadecyltrimethylammonium chloride (CTACl), and silica precursors, H2O, HCl, glycin, hexadecyltrimethylammonium chloride (CTACl), and silica precursors; H2O, HCl, glycin, hexadecyltrimethylammonium chloride (CTACl), and sodium silicate; H2O, HCI, hexadecyltrimethylammonium chloride (CTACl), and silica precursors); and H2O, HCI, hexadecyltrimethylammonium chloride (CTACl); and sodium silicate. Other combinations and reactants may be effective as well.

The silica precursors cited above include: alkylalkoxysilane; ethylpolysilicate; tetraethylorthosilicate (TEOS); tetramethylorthosilicate (TMOS); partially hydrolyzed TEOS; partially hydrolyzed TMOS or a combination thereof.

Another object of the invention is to encapsulate fluorescent dyes in nanopores of a silica matrix, which results in an assembly of ultrabright fluorescent particles by inserting surfactant molecules inside a plurality of channels/pores; using the walls of silica between said channels/pores to prevent dimerization of said modules; and coating said silica wall with surfactant headgroups.

Another object of the invention is to add additional layers to prevent possible leakage of the dyes from the channels.

BRIEF DESCRIPTION OF THE DRAWINGS

These and other features, aspects, and advantages of the present invention will become better understood with regard to the following description, appended claims, and accompanying drawings where:

FIG. 2(a) illustrates a scanning electron microscope image showing variety of shapes of synthesized mesoporous particles.

FIGS. 2 (b)-(c) illustrate optical images of the assembled discoids/gyroids;

FIG. 3 (a) illustrates fluorescence spectra of R6G dye water solution, concentration $3 \times 10^{-6}$ M;

FIG. 3 (b) illustrates R6G dye encapsulated in silica particles, concentration $9 \times 10^3$ v %;

FIG. 3 (c) illustrates absorbance of both solutions;

FIG. 5 (b) illustrates particle size distribution obtained from Dynamic Light Scattering;

FIG. 7 (b) illustrates the fluorescence spectra of the free dye in water;

FIG. 7 (c) illustrates the spectrum of the synthesizing sol (with no silica precursor, tetraethylorthosilicate);

FIG. 7 (d) illustrates the absorbance/extinction spectra of the free dye and the fluorescent nanoparticles with the encapsulated dye.

FIG. 8(a) illustrates a SEM image of well-formed fibers:

FIGS. 8(b)-(c) illustrates that low curvature of fibers begin to disappear with concomitant formation of high curvature and well-formed 2-4 IAM sized discoids upon increasing the synthesis temperature [FIG. 8 (B)-(C)]. The fiber to discoid transformation was complete at 70° C.;

DETAILED DESCRIPTION OF THE INVENTION

This disclosure relates to the design and synthesis of nanoporous (also called mesoporous) silica particles of the diameters ranging from tens of nanometers to tens of microns. To synthesize mesoporous silica particles, the process of self-organization of mesoporous silica via acidic cationic surfactant templating and condensation of silica precursor was used (Sokolov and Kievsky, 2005, Yang et al., 1999). The dyes are added either during or at the beginning the synthesis in the concentrations that are several times higher than the concentration of dimerization of fluorescent molecules. A dye-surfactant aqueous solution can also be added later to the nanoporous particles. To prevent possible leakage of the dyes out of the silica matrix, the particles can additionally be coated through any coating process, including sol-gel, various forms of vapor deposition, spay-dry, etc.

The main idea of the disclosure is in attaining high concentration of the dye inside cylindrical pores of mesoporous silica matrix of particles without dimerization. This is achieved through the presence of surfactant molecules inside the channels/pores, which can act as dispersants. See FIG. 1. Secondly, the silica walls between the channels do not naturally let the dye molecules dimerize in perpendicular to the channels' directions. Potentially, interaction with the silica surface can also decrease fluorescence. The interaction of the dye molecules with the silica wall is also diminished because the silica wall is indeed coated by the surfactant headgroups.

Figure 1:
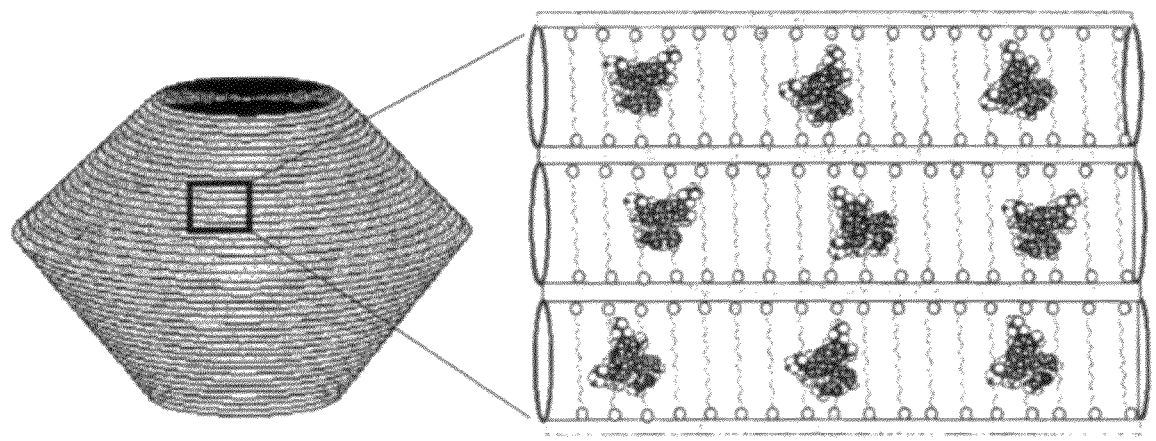
FIG. 1 illustrates schematics of the location of the dyes inside the synthesized shapes.

FIG. 1 illustrates schematics of the location of the dyes inside the synthesized shapes. The right side of the image illustrates a "zoomed" area of the channels with the dye encapsulated inside channels. Alkane chains of surfactant molecules (shown as zigzag vertical lines with the headgroups adjacent to silica walls) act as separators between the dye molecules, preventing dimerization of the dye molecules in the direction along the channels. In the perpendicular directions, the silica walls play the role of a separator to prevent dimerization.

Example 1

As an example of the described above idea, we describe a synthesis of nanoporous discoids/gyroids (Sokolov and Kievsky, 2005, Yang et al., 1999) with rhodamine 60 dye ($1-20\times10^{-3}$ M concentration). Typical dimensions of discoids/gyroids are seen in FIG. 2. One can also see some fiber shapes. Fibers typically are noticeably larger than discoids/gyroids. Therefore, it is not difficult to separate them if needed by either filtering or fluidic separation (See FIGS. 1 b and c).

FIG. 2(a) illustrates a scanning electron microscope image showing a variety of shapes of synthesized mesoporous particles. One can see the discoids/gyroids, and fiber shapes. The bar size is 11 gym. The insert illustrates specific "rays" type defects found on some particles. See FIGS. 2 (b and d) illustrating optical images of the assembled discoids/gyroids. FIG. 2 (b) illustrates the transmitted image and FIG. 2(c) illustrates the dark-field image of the particles with encapsulated rhodamine 6G dye.

The concentration of rhodamine 6G inside nanoporous silica particles was found to be about $4\times10^2$ M. It is worthwhile noting a recent report (Calzaferri et al., 2003) of encapsulation of dyes inside zeolites, where a similar effect was observed. 10 times higher concentrations of dye monomers was reported. Using the pore geometry of these particles (Sokolov and Kievsky, 2005, Yang et al., 1999), one can estimate that the above concentration corresponds to ~3 nm distance between the dye molecules inside the pores. A sketch of such a configuration is illustrated in FIG. 1. To describe fluorescent activity of the particles, we first use confocal microscopy and fluorometry. A confocal microscope (Nikon Cl, 543 nm laser, 100×NA 1.4 objective) allows focusing laser light within a volume less then a cubic micron. By placing both particles and dye solution at a concentration of $5\times10^5$ M on a glass slide, one can compare fluorescent signal coming out of the particle inside and from a similar volume of the dye solution. Such a direct comparison shows ~200 times higher signal coming from the particles vs. a dye solution. This is in good agreement with a comparison using fluorescent spectroscope, see below.

Fluorescent and UV-VIS spectrometers are used to compare fluorescent brightness for the other excitation wavelengths and to find the quantum efficiency of the encapsulated dyes. Spectra for the solution of R6G dye and R6G in the particles are shown in FIG. 3. To compare fluorescence coming from the same volume of the dye solution and the particle's bulk, we first found the particle's volume. To decrease scattering effect of the particles, we used a fairly low particle's suspension ($9\times10^{-3}$v %). (At that concentration, a further decrease of the concentration leads to linear change of fluorescent signal.) Fluorescence is recorded keeping all parameters of the spectrometer the same. In order to compare the signals from the dye and particles, we multiplied the signal collected from the particles by the ratio of volumes of water and particle in the particle's suspension. By comparing the absolute maxima, one can see that the particles are ~800 times more fluorescent than the aqueous solution of dye with concentration of $5 \times 10^{-6}$ M. This corresponds to ~5000 times of the dye maximum at its maximum non-dimerized concentration, ~$5 \times 10^{-6}$ M.

FIG. 3 (a) illustrates the fluorescence spectra of R6G dye water solution, with a concentration of $3 \times 1(1^6$ M. FIG. 3 (b) illustrates and R6G dye encapsulated in silica particles, concentration $9 \times 10^{t3}$ v %, and FIG. 3 (c) illustrates the absorbance of both solutions.

By comparing the fluorescence and absorbance, one can estimate the quantum yield of the dye inside pores of silica particles. Following the Williams reference (Williams et al., 1983), using R6G at concentration $3 \times 10^{-6}$M as a reference, we estimated quantum yield to be ~10% (excitation wavelength of 488 nm). It is interesting to analyze this value. One can find that the ratio of the integral fluorescence of particles ($9 \times 10^{-3}$ v % concentration) to the dye solution ($3 \times 10^{-6}$M concentration) is about $\frac{1}{16}$ for 488 nm excitation. By using the found dye concentration in the synthesized particles ($4 \times 10^{-2}$M), and taking the quantum yield of R6G equal 95%, assuming no dimerization and no change of quantum yield of the dye inside the particle's pores, one can expect the quantum yield of the dye inside the particle to be ~5% ($95\% * \frac{1}{16} * 1/(9 \times 10^{-5}) * 3 \times 10^{--6}$ M/($4 \times 10^{-2}$ M)), which is fairly close to the previous estimation. Both of these estimations, however, do not take into account strong scattering of excitation light by silica particles, which can be clearly seen in FIG. 3 (b). The same scattering brings broad spectral decrease of transmitted light which is seen as elevated background in the particle's absorbance plot, FIG. 3(c). If we subtract this background from the particle's absorbance value, i.e., leaving presumably only dye-specific absorbance, we get a quantum yield of the dye inside the particles to be ~90%. This implies that the quantum yield of the encapsulated dye is virtually unchanged compared to the dye in water. While detailed analysis is shown here for rhodamine 6G dye, similar results are observed for the other, dyes and their mixes.

This example has recently been published in (Sokolov et al., 2007).

Example 2

Here we describe a new class of silica fluorescent nanoparticles (30 nm in diameter), in which organic, fluorescent dyes are presumably physically entrapped inside self-sealed silica nanochannels. Due to one-dimensional confinement of the dye molecules inside the channels, the dyes can be packed without quenching fluorescence 250× denser inside the nanoparticles than in an aqueous medium.

The particles are synthesized using a method based on "origami" type of templated sol gel synthesis (Sokolov and Kievsky, 2005, Yang et al., 1999). Silica comes from the hydrolysis and the condensation of different water soluble organic silica precursors (organosiloxanes) in acidic conditions in the presence of formamide. To synthesize the silica fluorescent nanoparticles, the origami synthesis (Sokolov et al., 2007) with rhodamine 6G fluorescent dye was stopped after approximately 4 hours. Atomic Force Microscopy and Dynamic Light Scattering (Dynamic Light Scattering, results shown in FIG. 2(b)) indicate the presence of fluorescent nanoparticles in the synthesizing sol. A small percentage of micron size particles can also be seen. Immediately, the sol was neutralized with an alkaline solution, e.g., sodium hydroxide, or just diluted by a 5-10 fold with ultrapure water deionized water (MilliQ water). The solution is then dialyzed in quiescent conditions against ultrapure water for up to one week (fluorescence of the fluorescent nanoparticles solution should remain constant after that period of time). An aqueous solution of the particles was further passed through a 100 nm syringe filter, and finally, centrifuged to remove possible agglomerates (supernatant was collected).

Figure 4:
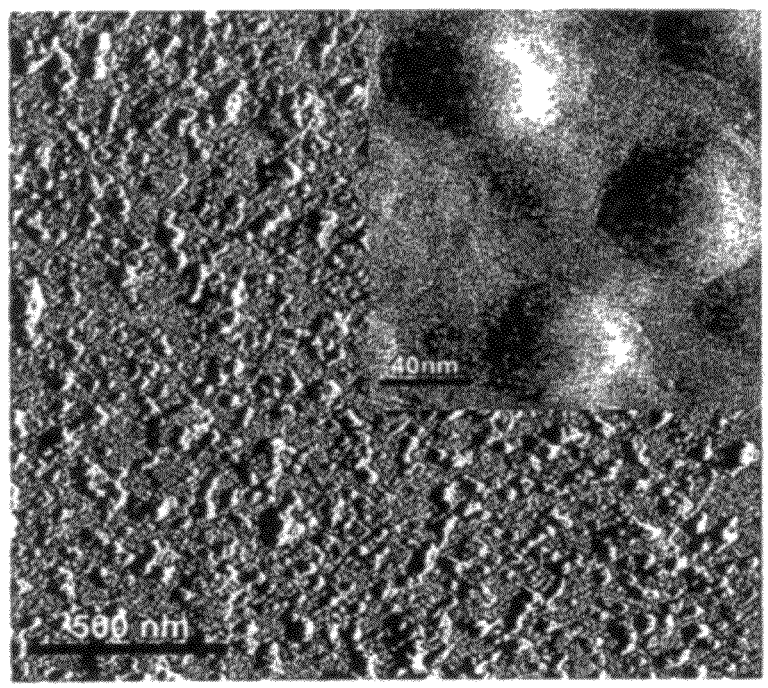
FIG. 4 illustrates an atomic force microscopy image of the nanoparticles dispersed on a graphite surface.
Figure 5:
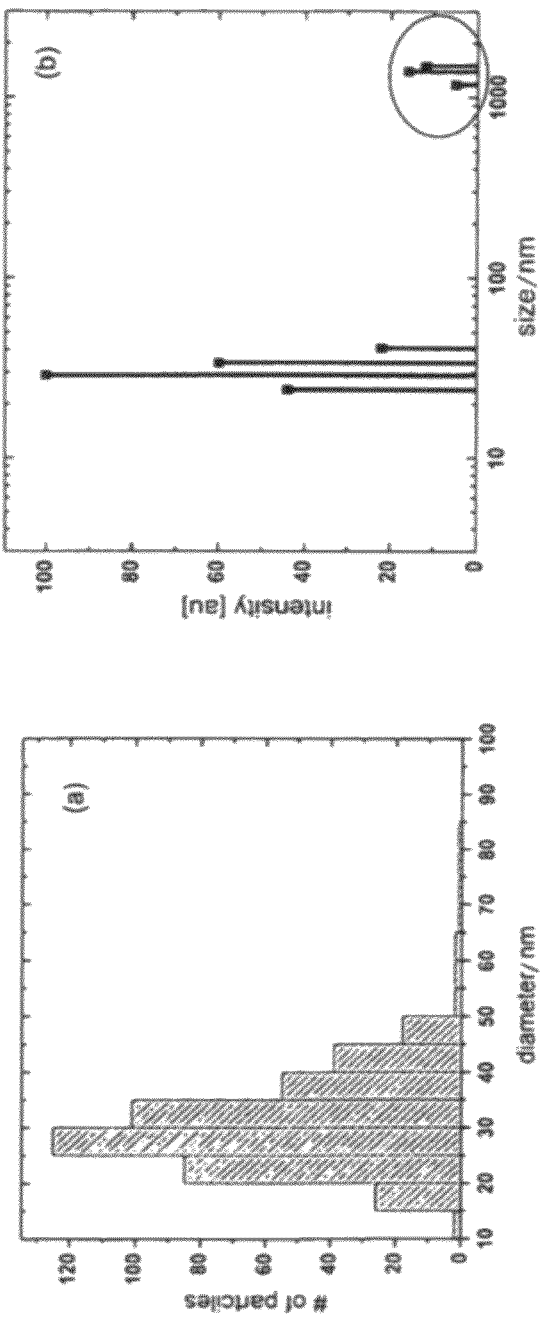
FIG. 5 (a) illustrates particle size distributions obtained from Atomic Force Microscopy.

To study the particle size and morphology three complementary techniques: atomic force microscopy, dynamic light scattering and transmission electron microscopy can be used. FIG. 4 illustrates an atomic force microscopy image of air dried fluorescent nanoparticles on a graphite slide. Particle-size analysis, see FIG. 5 (a), illustrates that we are dealing with particle diameters that averaged at 31 nm with a 9 nm standard deviation (using SPIP 4 software, version 4; the diameter was estimated after taking into account the atomic force microscopy tip convolution). Dynamic light scattering data, as shown in FIG. 5 (b), illustrates a quite narrow size distribution centered at 30 nm (supporting materials). One can see very good agreement with the atomic force microscopy data. It was difficult to obtain transmission electron microscopy image of the particles. The particles tend to form almost continuous films when placed on a transmission electron microscopy grid from an aqueous environment. Separate particles were seen only as attached to the edge of those films. Transmission electron microscopy data show a nanostructure of the particles with periodicity ca. 4 nm, FIG. 6, which is in agreement with the lattice constant of the origami structure (Sokolov and Kievsky, 2005, Yang et al., 1999, Sokolov et al., 2007). It is interesting to note that some smaller particles (10-20 nm) observed with transmission electron microscopy only partially showed the ordered structure only partially See FIG. 6 (b).

FIG. 4 illustrates an atomic force microscopy image of the nanoparticles dispersed on a graphite surface.

FIG. 5 (a) illustrates particle size distributions obtained from atomic force microscopy. FIG. 5 (b) illustrates particle size distributions obtained from dynamic (a) and DLS (b). After stopping the synthesis, the sol contains mostly nanoparticles with some percentage of large particles as seen in FIG. 5 (b). After filtration and centrifugation as described in the text, only nanoparticles are left.

Figure 6:
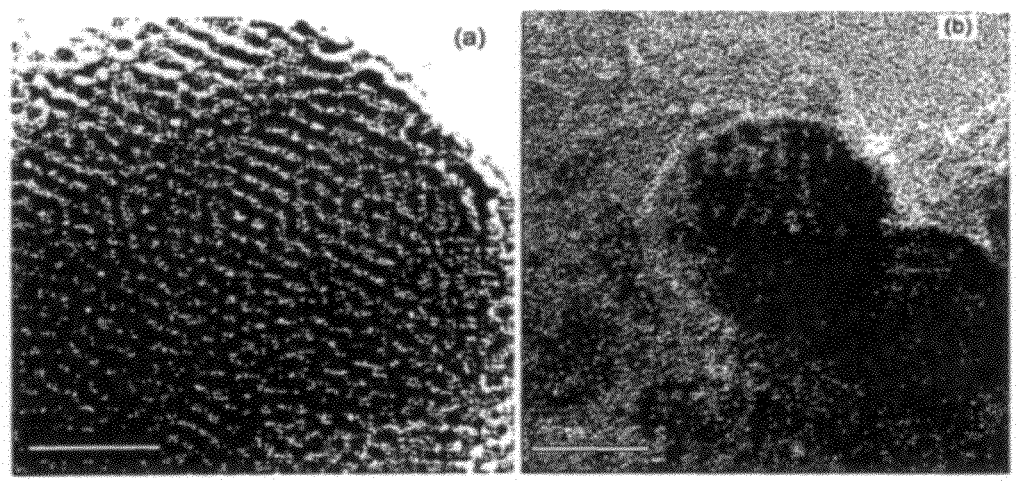
FIG. 6 illustrates electron microscopy images showing nanoporosity of the particles.

FIG. 6 illustrates transmission electron microscopy images showing nanoporosity of the particles. Scale bars are 20 nm (on the left) and 10 nm (on the right).

Figure 7:
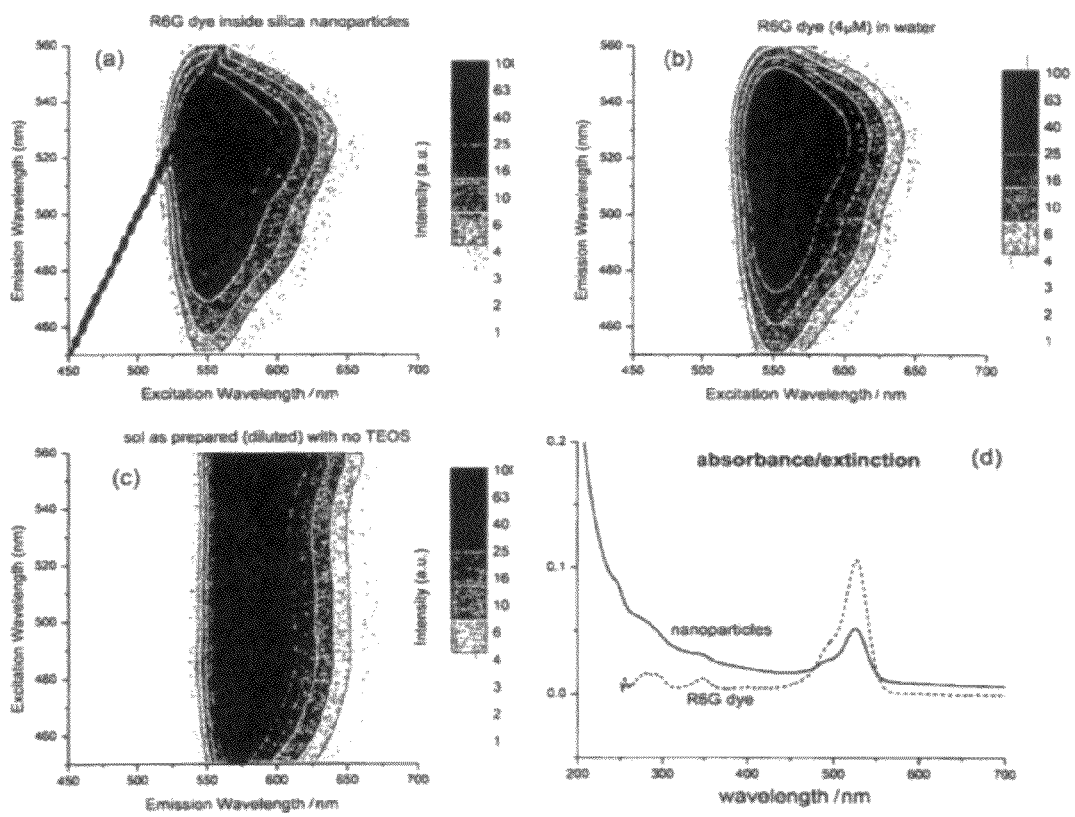
FIG. 7 (a) illustrates the fluorescence spectra of the synthesized nanoparticles.

FIG. 7 illustrates "3D" a fluorescent spectra of the synthesized fluorescent nanoparticles in water. See FIG. 7 (a). For comparison, the spectra of the same dye in water (and the maximum non-dimerized concentration, 41.tM) are shown, FIG. 7 (b). The spectrum of the synthesizing sol (with no silica precursor, tetraethylorthosilicate) is also presented to check a possible fluorescent shift due to the presence of acid and surfactant, and organic solvent (formamide). One can see a red shift of the fluorescent maximum in the sol, whereas there is no shift in the final product, synthesized silica fluorescent nanoparticles. Fluorescence of fluorescent nanoparticles is almost identical to the free dye in water (except the straight line corresponding to the direct scattering of excitation light by the nanoparticles). Carefully comparing the free dye and nanoparticle's spectra, one can recognize more difference. The spectra excited with the wavelength below the excitation maximum (525 nm) are a bit narrower for nanoparticles. It should be noted that the spectra of fluorescent nanoparticles are identical to the spectra of origami micron size particles reported in Sokolov et al., 2007. Absorbance (extinction) spectra of free dye and the fluorescent nanoparticles with the encapsulated dye are also almost identical near the region of maximum absorbance, as illustrated in FIG. 7 (d). For shorter wavelengths there is a considerable deviation in the absorbance spectra due to the known light scattering, extinction by the fluorescent nanoparticles.

FIG. 7 (a) illustrates fluorescence spectra of the synthesized nanoparticles (a). FIG. 7 (b) illustrates fluorescence spectra of and free dye in water. The spectrum of the synthesizing sol (with no silica precursor, tetraethylorthosilicate) is shown in FIG. 7 (c). All spectra are normalized on 100 au fluorescence for better comparison. The absorbance/extinction spectra of the free dye and the fluorescent nanoparticles with the encapsulated dye are illustrated in FIG. 7 (d).

The quantum efficiency of the encapsulated dye was measured following standard method relating fluorescence and absorbance at low concentrations using R6G dye as a, reference dye (Williams et al., 1983). Using a 488 nm excitation, we found that that within the error of measurement, the quantum efficiency of the dye inside of the particles stays the same as in water solution, —90-100%. Because of that, and due to the fact that the spectra of the dye inside of the particles is virtually identical to free dye, we can conclude that the dye is not chemically altered, just physically entrapped inside of the silica nanoporous matrix.

To estimate the concentration of the dye inside nanoparticles, we weighted the nanoparticles by using a quartz microbalance (QCM). Four microliters of the particles in DI water was dried in vacuum desiccators for 1 hour. The experiment was repeated three times with two different Quartz crystals. The average mass of the precipitant, nanoparticles was found to be $6.9(+/-1.2) \times 10^{-7}$ g. Assuming the mass density of the nanoparticles is equal to the density of large origami particles (Sokolov et al., 2007), ca.1.6 g/cm$^3$, one can get 1.1×10-2% for the volume concentration of the nanoparticles in water. Extracting the dyes from the particles as described in Sokolov et al., 2007, and using the Beer's law, we found that the nanoparticles retain 1.0 mM of R6G dye (0.3 lmg of the dye per 1 g of the particles). This corresponds to approximately 8 molecules of R6G dye per fluorescent nanoparticles. Because each quantum dot is approximately 20 times brighter than a single R6G molecule (Han et al., 2001), each silica fluorescent nanoparticles has approximately 0.4 of the brightness of a single quantum dot. The synthesis used here is capable of the assembly of considerably brighter micron size particles. Therefore, we can conclude that the brightness reported here is not the top limit of this method.

To find relative brightness of the fluorescent nanoparticles with another independent method, we compared the fluorescent nanoparticles fluorescent brightness to the maximum brightness of water solution of pure R6G dye (observed for concentrations ca. 4 pM). Because both spectra have maxima at ca. 555 nm, we compared the fluorescence at that wavelength. For the above estimated concentration of nanoparticles, $1.1 \times 10^{-2}$%, the brightness was 21 vs. 830 (arbitral units) for the dye solution in water at 4 gM concentration. To find the relative brightness, one needs to compare the amount of fluorescence coming from the same volume of the particle's material and the dye solution. The result, one gets is that the particles are 230 times $(21/830*100\%/1.1 \times 10^{2}\%)$ brighter than the maximum fluorescence of free dye solution. This increase in brightness is in quantitative agreement with the estimated dye concentration inside of the particles. Taking into account the concentration of the dye in water, 4 uM, and comparing it to the concentration of the dye inside the particles, 1.0 mM, one can find that the particles should be 250 times brighter than the similar volume of the dye at its maximum non-dimerized concentration. The estimated ratio of 230 is slightly below that. This small difference can presumably be explained by a small scattering of excitation 488 nm light by the silica material of the nanoparticles.

To conclude, we were able to synthesize nanoparticles following the same route as was used for synthesis of ultra bright fluorescent micron particles. We have shown that the dye molecules are physically encapsulated inside nanosize channels/tubes inside fluorescent nanoparticles. Stable (no-leakage) concentration of the dye inside the particles is 0.31 mg per 1 g of the particles. This corresponds to approximately 8 molecules of R6G dye per single nanoparticle. It brings approximately 230 times brighter fluorescence than the maximum emission from the aqueous dye solution of the same volume.

Example 3

By using an inorganic precursor, disodium trioxosilicate, we describe the synthesis of mesoporous silica fibers and discoids (24 μm) that possess self-sealed pore architecture. It is a simple and one-step synthesis procedure and does not require use of organic solvents or other additives. Apart from inorganic silica precursor, it requires a cationic surfactant, for example, cetyltrimethylmmonium chloride as a structure directing agent under acidic condition. Fibers and discoids are obtained at room temperature and 70° C., respectively. The pore architecture of both types of particles is p6 mm, hexagonally packed parallel cylindrical channels. Discoids possess a circular architecture with pore channels running around the discoid axis. Fibers have endowing self-sealed pore architecture. Due to the unique pore arrangement, a large amount of fluorescent dye could be encapsulated inside the pores during the synthesis. Here we observed that a high amount of the dye can be entrapped inside the channels of the particles without dimerization or quenching, 10,000 times more compared to just dye solution in water. This brings us silica particles that up to 260 times brighter than the brightest particles of similar size synthesized with quantum dots (Han et al., 2001), and 1.5 times brighter than mesoporous ultra-bright discoids synthesized recently (Sokolov et al., 2007). This makes these particles the brightest fluorescent beads synthesized so far.

Figure 8:
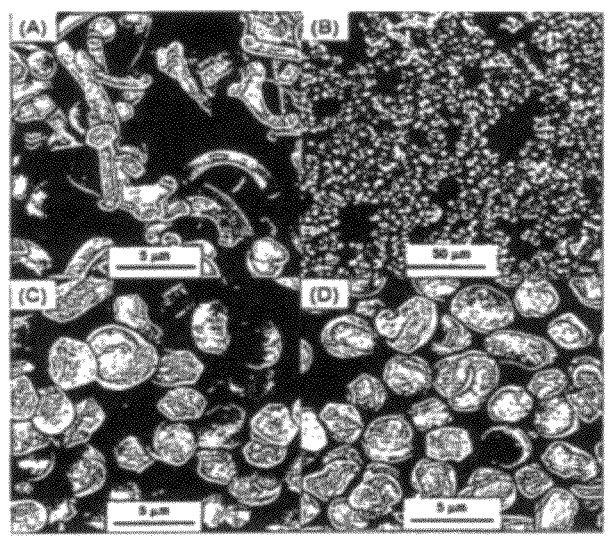
FIG. 8 illustrates scanning electron microscope images of a mixture of mesoporous silica fibers synthesized from the sol of molar composition 1 Na2SiO3.9H20: 1.5 CTAC: 28 HCl: 729 H2O at 20° C., 24 h (B) and (C) mesoporous silica discoids synthesized from the same sol but at 70° C., 24 h (D) calcined discoids.

FIG. 8 (A) illustrates a scanning electron microscope image of well-formed fibers. We observed that low curvature of fibers began to disappear with concomitant formation of high curvature and well-formed 2-4 tim sized discoids upon increasing the synthesis temperature. See FIGS. 8 (B) and FIG. 8 (C). The fiber to discoid transformation was complete at 70° C.

Figure 11:
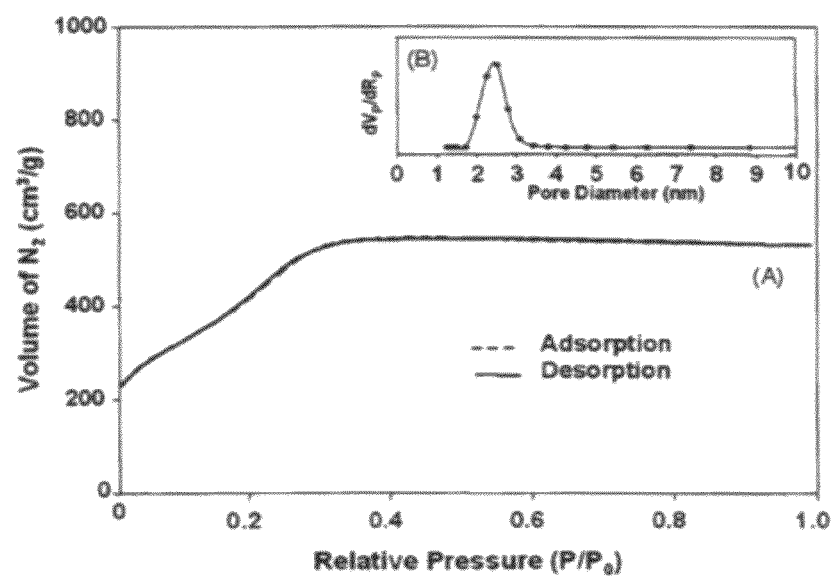
FIG. 11 illustrates N2 adsorption/desorption isotherm measured at 77 K on calcined mesoporous silica fibers. Inset (B) is the pore size distribution for the discoids.
Figure 12:
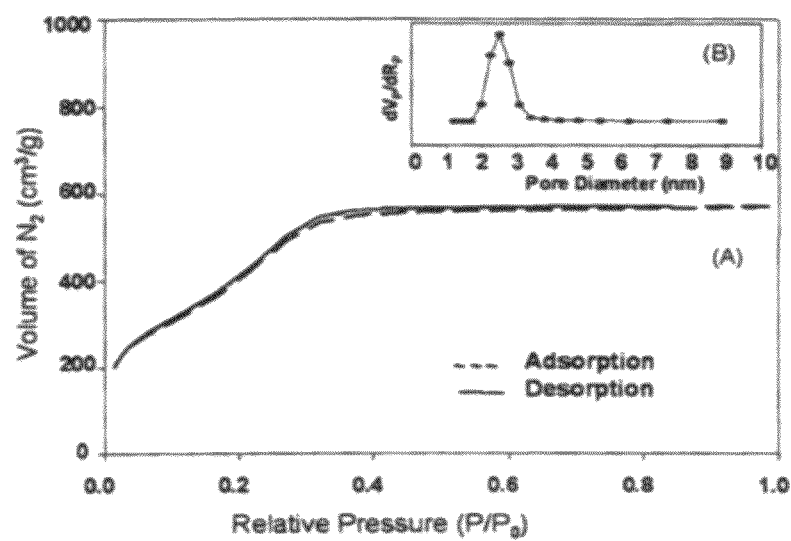
FIG. 12 illustrates N2 adsorption/desorption isotherm measured at 77 K on calcined mesoporous silica discoids synthesized from the sol of molar composition 1 Na2SiO3.9H20: 1.5 CTAC: 28 HCl: 729 H2O at 70° C., 24 h. Inset (B) is the pore size distribution for the discoids.
Figure 13:
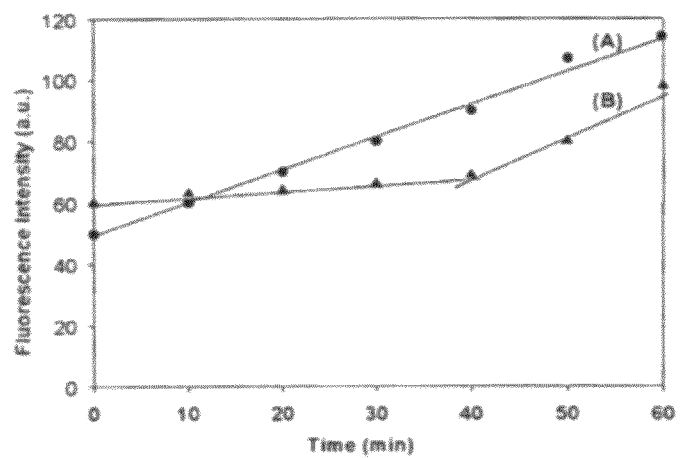
FIG. 13 illustrates variation in fluorescence of the water/R6G dye filled mesoporous silica particle suspension for (A) open channel silica fibers and (B) discoids at 65° C., under stirring.

The nitrogen adsorption/desorption measurement conducted at 77.3 K on the calcined fibers and discoids gave type IV isotherms as shown in FIGS. 11 and 12, respectively. There was little difference between the texture properties of fibers and discoids. Both the isotherms showed a step rise at −0.2 P/Po with little hysteresis, that is typical of high quality mesoporous materials. The mesopore size, FIGS. 5 (B) and 6 (B), was estimated from the adsorption branch of the isotherm according to the correlation obtained from Nonlinear Fluctuation-Dissipation Theorem (NLDFT) theory (Neimark and Ravikovitch, 2001), (Jaroniec et al., 1998). For fibers and discoids, the BET theory surface areas are 1330 and 1250 m$^2$/g; mesopore diameters; mesopore diameters are 2.4 nm and 2.5 nm and the pore volumes 0.93 cm$^3$/g and 0.96 cm$^3$/g, respectively.

Figure 9:
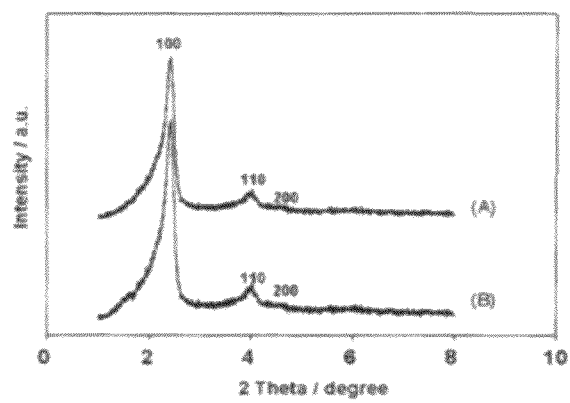
FIG. 9 illustrates an XRD pattern of the mesoporous as-synthesized silica fibers (A) and discoids (B) synthesized at 25° C., 24 h and 70° C., 24 h, respectively.

The hexagonal p6 mm structure of the fibers and discoids was established from an X-Ray Diffraction measurement as shown from the patterns in FIGS. 9 (A) and (B), respectively. The d100-spacings of ca. 46 A and 47 A was obtained for fibers and discoids, respectively. Calcination at 500° C. did not have any effect on overall morphology of the particles as confirmed from the scanning electron microscope images, as show in FIGS. 8 (C) and (D), for as-synthesized and calcined discoid, respectively. The pore architecture in the particle mesostructure was established from the transmission electron microscope images for fibers and discoids shown in FIG. 10. These images present a well-organized, hexagonal, p6 mm structure with hexagonally organized pores and possess a circular architecture with pore channels running around the discoid axis endowing self-sealed structure to the particles. Fibers have longitudinal architecture with the mesochannels oriented parallel to the fiber axis. However, the ends of the fibers, FIG. 10 (A), also have a sort of circular channels, i.e., self-sealed. The diameter of the channels obtained from a transmission electron microscope image was found to be well in agreement with that obtained from the X-Ray Diffraction measurements shown in FIG. 9.

Figure 10:
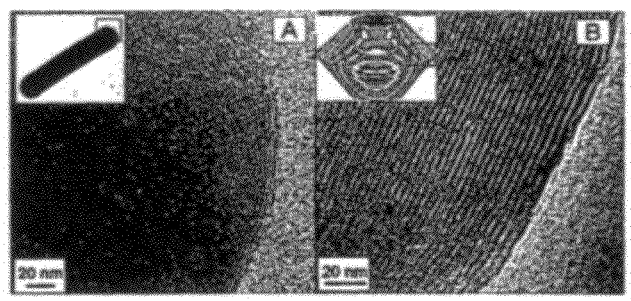
FIG. 10 illustrates TEM images at different magnification of the fiber end (A), and side of the discoids (B), showing the internal circular architecture and pore channels running around the particle axis.

FIG. 10 illustrates Transmission Electron Microscope images at different magnification of the fiber end (A), and side of the discoids (B), showing the internal circular architecture and pore channels running around the particle axis.

FIG. 11 illustrates N2 adsorption/desorption isotherm measured at 77 K on calcined mesoporous silica fibers. Inset (B) illustrates the pore size distribution for the discoids.

FIG. 12 illustrates N2 adsorption/desorption isotherm measured at 77 K on calcined mesoporous silica discoids synthesized from the sol of molar composition 1 Na2SiO3.9H20: 1.5 CTAC: 28 HCl: 729 H2O at 70° C., 24 h. Inset (B) illustrates the pore size distribution for the discoids.

Returning to the high fluorescent brightness of the synthesized particles, we need to estimate the amount of the dye retained in nanochannels of the particles, as well as the quantum yield of the encapsulated dye. The amount of R6G dye entrapped in the circular channels after washing away the loosely adsorbed dye was estimated to be 0.0176 and 0.0192 g/g of $SiO_2$, for fibers and discoids, respectively. Due to the unique self-sealed pore arrangement, this appreciable amount of fluorescent dye could be stored in mesostructures of the fibers and discoids without any leakage at regular temperatures. To study the leakage, a few R6G loaded particles were maintained suspended in water at 65° C., under stirring. The dye leaking out of the mesostructure was analyzed by using a fluorescent spectrophotometer. For comparison, dye leakage from mesoporous silica straight fibers with pore channels open at both ends (prepared using tetramethyl orthosilicate as a silica source) was compared (Kievsky and Sokolov, 2005). The results of this study are illustrated in FIG. 14.

Figure 14:
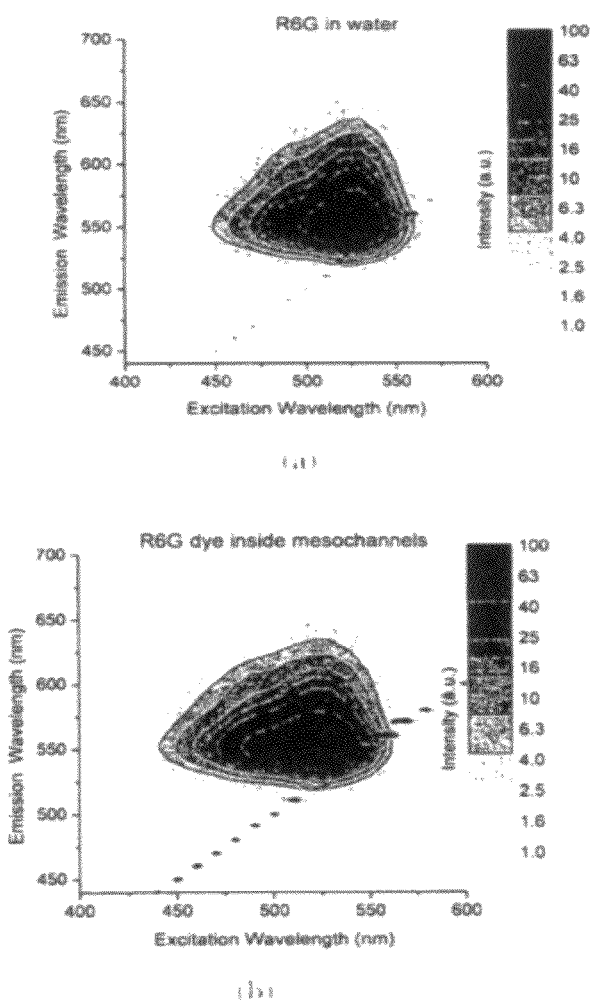
FIG. 14 illustrates three-dimensional fluorescent spectra (shown for various excitation wavelengths) for (a) free R6G dye in water and (b) the mesoporous silica particles loaded with R6G dye.

FIG. 14 illustrates the variation in fluorescence of the water/R6G dye filled mesoporous silica particle suspension for (A) open channel silica fibers and (B) discoids at 65° C., under stirring.

The straight fibers with open channels from both ends releases the dye continuously (plot A), as seen from the increase of fluorescence from the fiber particles immediately after suspending in water at 65° C. For discoids, on the other hand, virtually no leakage was observed for about 40 minutes. After that the release of the dye started, presumably due to deterioration of the silica structure under hydrothermal condition. The delay of the dye leakage from discoids is an indication of the self-sealed pore architecture of the channels in the discoids.

Figure 15:
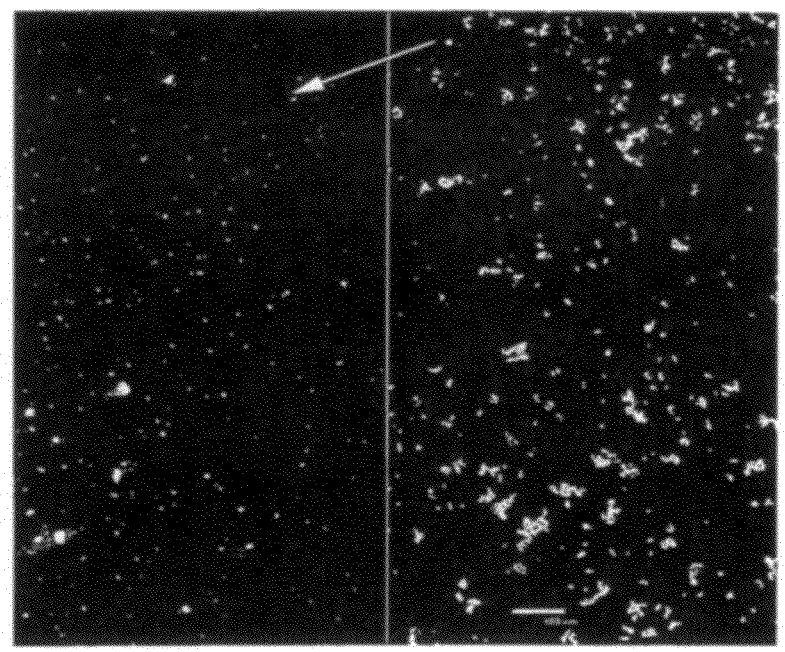
FIG. 15 illustrates a collage of two confocal images of the particles in a gradient of glycerol flow. The arrow shows the direction of the flow. One can clearly see leakage of the dye from uncoated particles (left) and no leakage after the coating (right image). The scale bar is 100 microns.

To study the interaction of the dye molecules with the mesochannels, we first estimated the quantum yield of the occluded dye using aqueous R6G as a standard (quantum yield=95). The R6G dye occluded inside our particles showed the same quantum yield as that of the free dye in aqueous solution within the error of measurement. Furthermore, the 3D fluorescent spectra (set of spectra shown for various excitation wavelengths) for our particles filled with dye and free dye in water are illustrated in FIG. 15. One can see that the spectra are almost identical (with a small exception when excitation is near 400 nm, which is presumably due to weak fluorescence of silica). All these observations tell us that we are dealing with just physical confinement of the dye molecules inside the silica mesochannels.

Retention of the dye in the circular mesochannels is of advantage as quenching of the dye, and the consequent loss of fluorescence, is prevented due to the spatial isolation of the dye molecules inside the channels. The unchanged quantum yield and virtually the same three-dimensional fluorescent spectra indicate no fluorescence quenching or dimerization of dye molecules inside the circular channels. So, we have the same situation as in (Sokolov et al., 2007), which leads to ultra-bright fluorescence of the particles carrying the dye. To estimate fluorescent brightness of the particles, we need to find the number of fluorescent molecules per particle. First we need to know the effective molar concentration of the dye inside the particle. Using the found weight concentration (0.0176 and 0.0192 g for fibers and discoids, respectively) of dye per gram of silica, and using the density of the mesoporous silica 1.5 g/cc, one can find 0.056 and 0.061 mole of the dye per 1 dm3 of mesoporous material for fibers and discoids, respectively. Such "concentration" is useful to compare with the concentration of R6G dye just in water that gives maximum fluorescence, —6011 M (Sokolov et al., 2007) (further increase of the dye concentration results in dimerization of the molecules, and the consequent quenching of fluorescence). One can see that we have an increase up to four orders of magnitude.

FIG. 15 illustrates 3D fluorescent spectra (shown for various excitation wavelengths) for the mesoporous silica particles loaded with R6G and free R6G dye in water.

These particles have slightly higher fluorescent (up to 1.5 times) than the mesoporous particles loaded with R6G dye reported in (Sokolov et al., 2007).

Coating Example

In some cases when long time stability of the particles is important, they can be coated with an additional layer preventing dye from the leakage. An example below shows how this can be done.

After initial washing the particles of example 1 with the DI water by centrifugation (stopped after we observed no dye in the supernatant), we did not observe any leakage of the dye when the particles are suspended in water. However, switching to an organic media, we did observe the leakage. For example, we found that ~75% of the dye was leaked out from the particles after dispersing in ethanol. Presumably, ethanol reacts with the silica surface partially breaking open the coiled mesopores and releasing the dye in the solvent. To circumvent this serious problem of dye leakage, we provided a secondary coating of silica onto the particle surface by vapor phase silica coating technique using the modification of the process developed by Nishiyama and co-workers (Nishiyama et al., 2005). The ultra-bright fluorescent origami particles were coated with CTAC sol, dried, and treated at 50° C. with tetraethylorthosilicate vapor, in presence of HCl, in a closed vessel resulting in a thin secondary coating of silica on origami particles. The morphology, structure of the ultrabright fluorescent origami particles did not change upon this treatment. The modified particles showed dye leakage of less than 10% markedly improving its capacity to retain dye in alcoholic solvents. FIG. 16 illustrates visualization of the leakage of the dye out of the particles in a water solution of glycerol. A droplet of glycerol was placed on one side of a cover slip sitting on a microscope slide. Aqueous dispersion of the particles was between the slide and cover slip. This creates a gradient of the glycerol flow in the direction shown in the figure by an arrow. One can clearly see leakage of the dye out of the particles before coating and no leakage after the coating. As to the noted that the amount of leakage is really small, and can be clearly seen only in switching to "colorized grayscale" mode of the confocal microscope. We believe that this simple technique of providing secondary silica coating onto the particles is a very attractive approach for preventing the dye leakage from the nanostructures.

FIG. 16 illustrates a collage of two confocal images of the particles in a gradient of glycerol flow. The arrow shows the direction of the flow. One can clearly see leakage of the dye from uncoated particles (left) and no leakage after the coating (right image). The scale bar is 100 microns.

In summary this disclosure discusses producing ultras bright fluorescent silica particles by synthesizing large nanopore silica particles with self sealed channels/pores and then stopping the synthesizing before large nanopore silica particles have been formed, wherein said sintering solution has produced nanoparticles. The large nanopore silica particles are micron size. The synthesizing is stopped by diluting said synthesizing solution with a neutralizing medium such as an aqueous solution of definite acidity of pH7 and higher an exemplary value of pH11 (sodium hydroxide). The time range for stopping the synthesizing ranges from tens of seconds to ten of minutes.

The process further includes extracting synthesis nanoparticles from the stopped synthesis using dialysis against the aqueous solution. Pure water is an exemplary aqueous medium. The process includes adding multiple luminescent dyes are added during the syntheses.

The process may use several different combinations of reactants which result in a self-sealed pore (no open pore) topology. These include: H2O, HCl, formamide; hexadecyltrimethylammonium chloride (CTACl), and silica precursors; H2O, HCl, glycin, hexadecyltrimethylammonium chloride (CTACl), and silica precursors; H2O, HCl, glycin, hexadecyltrimethylammonium chloride (CTACl), and sodium silicate; H2O, HCl, hexadecyltrimethylammonium chloride (CTACl), and silica precursors); and H2O, HCl, hexadecyltrimethylammonium chloride (CTACl); and sodium silicate. Other combinations and reactants may be effective as well. The silica precursors cited above include: alkylalkoxysilane; ethylpolysilicate; tetraethylorthosilicate (TEOS); tetramethylorthosilicate (TMOS); partially hydrolyzed TEOS; partially hydrolyzed TMOS or a combination thereof.

The disclosure also discusses a process to encapsulate fluorescent dyes in nanopores of a silica matrix, which results in an assembly of ultrabright fluorescent particles by inserting surfactant molecules inside a plurality of channels/pores; using the walls of silica between said channels/pores to prevent dimerizication of said modules; and coating said silica wall with surfactant headgroups. On addition the disclosure suggests adding additional layers to prevent possible leakage of the dyes from the channels.

This process described above allows the making of particles with the dye concentrations inside that are hundred to tens of thousands times brighter than maximum of fluorescent of similar volume of the dye in solution.

The process disclosed herein has significant applications such as labeling, sensors, tracking devices and in the medical field. Devices and products having ultra-bright fluorescence such as labeling, sensors, tracking and medical devices are included as products made by the methods and processes described above. The term ultra-bright comprises dye concentrations inside that are hundred to tens of thousands times brighter than maximum of fluorescent of similar volume of the dye in solution.

The illustrative embodiments and modifications hereto describe hereinabove are merely exemplary. It is understood that other modifications to the illustrative embodiments will readily occur to persons of ordinary skill in the art. All such modifications and variations are deemed to be within the scope and spirit of the present invention as will be defined by the accompanying claims.

The References cited above and listed below are hereby incorporated by reference.

BAKER, G. A., PANDEY, S., MAZIARZ, E. P. & BRIGHT, F. V. (1999) Toward tailored xerogel composites: Local dipolarity and nanosecond dynamics within binary composites derived from tetraethylorthosilane and ormosils, oligomers or surfactants. Journal of Sol-Gel Science and Technology, 15, 37-48.

CALZAFERRI, G., HUBER, S., MAAS, H. & MINKOWSKI, C. (2003) Host—Guest Antenna Materials. Angew. Chem. Int. Ed., 42, 3732-3758.

DEL MONTE, F. & LEVY, D. (1998) Formation of fluorescent rhodamine B J-dimers in sol-gel glasses induced by the adsorption geometry on the silica surface. Journal of Physical Chemitry B, 102, 8036-8041.

DESHPANDE, A. V. & KUMAR, U. (2002) Effect of method of preparation on photophysical properties of Rh—B impregnated sol-gel hosts. Journal of Non-Crystalline Solids, 306, 149-159.

EDWARDS, B. S., OPREA, T., PROSSNITZ, E. R. & SKLAR, L. A. (2004) Flow cytometry for high-throughput, high-content screening. Curr Opin Chem Biol, 8, 392-8.

FRANTZ, R., CARBONNEAU, C., GRANIER, M., DURAND, J. O., LANNEAU, G. F. & CORRIU, R. J. P. (2002) Studies of organic-inorganic solids possessing sensitive oligoarylene-vinylene chromophore-terminated phosphonates. Tetrahedron Letters, 43, 6569-6572.

HAN, M. Y., GAO, X. H., SU, J. Z. & NIE, S. (2001) Quantum-dot-tagged microbeads for multiplexed optical coding of biomolecules. Nature Biotechnology, 19, 631-635.

HASEGAWA, U., NOMURA, S. I., KAUL, S. C., HIRANO, T. & AKIYOSHI, K. (2005) Nanogel-quantum dot hybrid lesfor live cell imaging. Biochem Biophys Res Commun, 331, 917-921

JARONIEC, M., KRUK, M. & SAYARI, A. (1998) Adsorption methods for characterization of surface and structural properties of mesoporous molecular sieves. Mesoporous Molecular Sieves 1998, 117, 325-332.

KIEVSKY, Y. & SOKOLOV, I. (2005) Self-Assembly of Uniform Nanoporous Silica Fibers. IEEE Transactions on Nanotechnology, 4, 490-494.

KLONKOWSKI, A. M., KLEDZIK, K., OSTASZEWSKI, R. & WIDERNIK, T. (2002) Spectral properties of bis-9-anthryl derivatives immobilized in silica xerogel. Colloids and Surfaces a-Physicochemical and Engineering Aspects, 208, 115-120.

LEVENTIS, N., ELDER, I. A., ROLISON, D. R., ANDERSON, M. L. & MERZBACHER, C. I. (1999) Durable modification of silica aerogel monoliths with fluorescent 2,7-diazapyrenium moieties. Sensing oxygen near the speed of open-air diffusion. Chemistry of Materials, 11, 2837-2845.

LIN, Y. S., TSAI, C. P., HUANG, H. Y., KUO, C. T., HUNG, Y., HUANG, D. M., CHEN, Y. C. & MOU, C. Y. (2005) Well-ordered mesoporous silica nanoparticles as cell markers. Chemistry of Materials, 17, 4570-4573.

LIZARD, G., MONIER, S., PRUNET, C., DUVILLARD, L. & GAMBERT, P. (2004) [Microspheres, nanospheres and flow cytometry: from cellular to molecular analysis]. Ann Biol Clin (Paris), 62, 47-52.

MELDAL, M. (2002) The one-bead two-compound assay for solid phase screening of combinatorial libraries. Biopolymers, 66, 93-100.

NEIMARK, A. V. & RAVIKOVITCH, P. I. (2001) Capillary condensation in MMS and pore structure characterization. Microporous and Mesoporous Materials, 44, 697-707.

NISHIYAMA, N., TANAKA, S., EGASHIRA, Y. & OKU, Y. (2005) Chem. Mater., 15, 1006.

OHATA, H., YAMADA, H., NIIOKA, T., YAMAMOTO, M. & MOMOSE, K. (2003) Optical bioimaging: from living tissue to a single molecule: calcium imaging in blood vessel in situ employing two-photon excitation fluorescence microscopy. J Pharmacol Sci, 93, 242-7.

OW, H., LARSON, D., SRIVASTAVA, M., WEBB, W. W., BAIRD, B. & WIESNER, U. (2003) Fluorescent silica nanoparticles for nanoscale biological imaging. Abstracts of Papers of the American Chemical Society, 225, U639-U639.

RAO, A. P. & RAO, A. V. (2003) Studies on the effect of organic additives on the monolithicity and optical properties of the rhodamine 6G doped silica xerogels. Materials Letters, 57, 3741-3747.

SANTRA, S., XU, J., WANG, K. & TAN, W. (2004). Luminescent nanoparticle probes for bioimaging. J Nanosci Nanotechnol, 4, 590-9.

SOKOLOV, I. & KIEVSKY, Y. (2005) 3D Design of Self-Assembled Nanoporous Colloids. Studies in Surface Science and Catalysis, 156, 433-443.

SOKOLOV, I., KIEVSKY, Y. & KASZPURENKO, J. M. (2007) Self-assembly of ultra-bright fluorescent silica particles. Small, 3, 419-423.

SURATWALA, T., GARDLUND, Z., DAVIDSON, K., UHLMANN, D. R., WATSON, J. & PEYGHAMBARIAN, N. (1998) Silylated coumarin dyes in sol-gel hosts. 1. Structure and environmental factors on fluorescent properties. Chemistry of Materials, 10, 190-198.

WILLIAMS, A. T. R., WINFIELD, S. A. & MILLER, J. N. (1983) Relative Fluorescence Quantum Yields Using a Computer-controlled Luminescence Spectrometer. Analyst, 108, 1067-1071.

YANG, S. M., SOKOLOV, I., COOMBS, N., KRESGE, C. T. & OZIN, G. A. (1999) Formation of hollow helicoids in mesoporous silica: Supramolecular Origami. Advanced Materials, 11, 1427-1431.

ZHAO, X. J., BAGWE, R. P. & TAN, W. H. (2004) Development of organic-dye-doped silica nanoparticles in a reverse microemulsion. Advanced Materials, 16, 173-176.

What is claimed is:

1. A method for synthesizing a plurality of ultra-bright luminescent silica particles, the method comprising the steps of:
   initiating a cationic acidic templating synthesizing reaction utilized to form large nanoporous silica particles that have self-sealed nanosize pores, the synthesizing reaction including a synthesizing solution comprising a cationic surfactant at or above critical micellar concentration, water, an organosilicate or sodium silicate as a silica precursor, hydrochloride acid, and at least one luminescent dye material, and optionally at least one of formamide and glycin; and
   stopping, after said plurality of ultra-bright luminescent silica nanoparticles have been produced but before large nanoporous silica particles are formed, the synthesizing reaction by adding a neutralizing medium to the synthesizing reaction, wherein the pH of said neutralizing medium is 7 or higher.

2. The method of claim 1 wherein said large nanoporous silica particles are micron size.

3. The method of claim 1 wherein the pH of said synthesizing solution is 11.

4. The method of claim 1 further comprising the step of:
   extracting, by dialysis, synthesized plurality of ultra-bright luminescent silica nanoparticles from said stopped synthesizing reaction.

5. The method of claim 1, wherein said synthesizing solution comprises $H_2O$, HCl, formamide, hexadecyltrimethylammonium chloride (CTACl), and silica precursor, which results in a self-sealed pore topology.

6. The method of claim 5 wherein said silica precursor is selected from the group consisting of alkylalkoxysilane, tetraethylorthosilicate (TEOS), tetramethylorthosilicate (TMOS), partially hydrolyzed TEOS, partially hydrolyzed TMOS, and combinations thereof.

7. The method of claim 1, wherein said synthesizing solution comprises $H_2O$, HCl, glycin, hexadecyltrimethylammonium chloride (CTACl), and silica precursor, which results in a self-sealed pore topology.

8. The method of claim 7 wherein said silica precursor is selected from the group consisting of alkylalkoxysilane, tetraethylorthosilicate (TEOS), tetramethylorthosilicate (TMOS), partially hydrolyzed TEOS, partially hydrolyzed TMOS, and combinations thereof.

9. The method of claim 1, wherein said synthesizing solution comprises $H_2O$, HCl, glycin, hexadecyltrimethylammonium chloride (CTACl), and sodium silicate, which results in a self-sealed pore topology.

10. The method of claim 1, wherein said synthesizing solution comprises $H_2O$, HCl, hexadecyltrimethylammonium chloride (CTACl), and silica precursor, which results in self-sealed pore topology.

11. The method of claim 10 wherein said silica precursor is selected from the group consisting of alkylalkoxysilane, tetraethylorthosilicate (TEOS), tetramethylorthosilicate (TMOS), partially hydrolyzed TEOS, partially hydrolyzed TMOS, and combinations thereof.

12. The method of claim 1, wherein said synthesizing solution comprises $H_2O$, HCl, hexadecyltrimethylammonium chloride (CTACl), and sodium silicate, which results in self-sealed pore topology.

13. The method of claim 1 wherein a concentration of said luminescent dye encapsulated within said nanosize pores of said plurality of nanoporous silica particles allows retaining higher luminescence in comparison with the maximum luminescense emitted from the same concentration of said luminescent dye in a luminescent dye solution absent said plurality of nanoporous silica particles.

14. The method of claim 1, wherein said cationic surfactant is cetyltrimethylammonium chloride.

15. The method of claim 1, further comprising the step of adding a layer to the exterior of each of said plurality of ultra-bright luminescent silica particles, wherein said external layer prevents leakage of said luminescent dye material.

* * * * *